(12) United States Patent
Iliadis

(10) Patent No.: US 9,141,526 B2
(45) Date of Patent: Sep. 22, 2015

(54) RECLAIMING UNITS BY SEARCHING UNITS FOR A PREDETERMINED CRITERION AND STORING DATA FROM A VALID SUBUNIT

(75) Inventor: Ilias Iliadis, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 626 days.

(21) Appl. No.: 13/231,996

(22) Filed: Sep. 14, 2011

(65) Prior Publication Data

US 2012/0072683 A1    Mar. 22, 2012

(30) Foreign Application Priority Data

Sep. 16, 2010   (EP) ..................................... 10177171

(51) Int. Cl.
   G06F 12/00    (2006.01)
   G06F 12/02    (2006.01)

(52) U.S. Cl.
   CPC ............ G06F 12/0246 (2013.01); G06F 12/02 (2013.01); G06F 12/023 (2013.01); G06F 12/0253 (2013.01); G06F 12/0269 (2013.01); G06F 2212/7201 (2013.01); G06F 2212/7205 (2013.01)

(58) Field of Classification Search
   CPC ............ G06F 12/0246; G06F 12/0269; G06F 2212/7211; G06F 12/0253; G06F 2212/7205; G06F 12/0646; G06F 12/02; G06F 12/023; G06F 2212/7201
   USPC ............................ 711/103, 170, 154; 707/813
   See application file for complete search history.

(56) References Cited

U.S. PATENT DOCUMENTS

| | | | |
|---|---|---|---|
| 5,745,418 A * | 4/1998 | Ma et al. .................. | 365/185.33 |
| 5,956,473 A * | 9/1999 | Ma et al. ......................... | 714/5.1 |
| 6,256,642 B1 * | 7/2001 | Krueger et al. ........................ | 1/1 |
| 2003/0196042 A1 * | 10/2003 | Hopeman et al. ............. | 711/133 |
| 2005/0198088 A1 * | 9/2005 | Subramoney et al. ........ | 707/206 |
| 2006/0074872 A1 * | 4/2006 | Gordon ............................ | 707/3 |
| 2007/0150689 A1 * | 6/2007 | Pandit et al. .................. | 711/170 |
| 2012/0144152 A1 * | 6/2012 | Jeddeloh ....................... | 711/206 |
| 2012/0297123 A1 * | 11/2012 | Cherubini et al. ............ | 711/103 |

OTHER PUBLICATIONS

J. Menon and L. Stockmeyer, "An Age-Threshold Algorithm for Garbage Collection in Log-Structured Arrays and File Systems,", High Performance Computing Systems and Applications, pp. 119-132, 1998.

(Continued)

*Primary Examiner* — Hong Kim
(74) *Attorney, Agent, or Firm* — Francis Lammes; Stephen J. Walder, Jr.; Jeff Tang

(57) ABSTRACT

A method and apparatus for managing write operations in memory. The method includes a memory including units, each of the units including subunits. Data updates are written "out-of-place", in that new data does not overwrite the memory locations (subunits) where the data is currently stored. The at least one subunit containing the outdated data is marked as invalid. As a result, a subunit can contain up to date data in a valid subunit next to invalid subunits. For reclaiming units for erasure, it is searched amongst the units to identify a unit or units that match a predetermined criterion. The data of valid subunits of such identified unit is rewritten to another unit or units.

18 Claims, 3 Drawing Sheets

(56) References Cited

OTHER PUBLICATIONS

I. Illiadis, "Performance of the Greedy Garbage-Collection Scheme in Flash-Based Solid-State Drives," IBM Research Report, RZ3769, Mar. 2010.

X.-Y. Hu, E. Eleftheriou, R. Haas, I. Illiadis, and R. Pletka, ",Write Amplification Analysis in Flash-Based Solid State Drives," in Proceedings of the Israeli Experimental Systems Conference (SYSTOR) (Haifa, Israel), pp. 1-9, May 2009.

M. Rosenblum and J. K. Ousterhout, "The Design and Implementation of a Log-Structured File System," ACM Trans. Comput. Syst., vol. 10, No. 1, pp. 26-52, Feb. 1992.

* cited by examiner

RECLAIMING UNITS BY SEARCHING UNITS FOR A PREDETERMINED CRITERION AND STORING DATA FROM A VALID SUBUNIT

CROSS-REFERENCE TO RELATED APPLICATION

This application claims priority under 35 U.S.C. §119 from European Patent Application No. 10177171.5 filed Sep. 16, 2010, the entire contents of which are incorporated herein by reference.

BACKGROUND OF THE INVENTION

1. Field of the Invention

The present invention relates to managing a computerized memory for storing data.

2. Description of Related Art

Solid-state memory devices encompass rewritable non-volatile memory devices which can use electronic circuitry for storing data. Currently, solid-state memory devices start replacing conventional storage devices such as hard disk drives and optical disk drives in some arenas, such as in mass storage applications for laptops or desktops. Solid state memory devices are also investigated for replacing conventional storage devices in other areas such as in enterprise storage systems. This is because solid state memory devices offer exceptional bandwidth as well as excellent random I/O (input/output) performance along with an appreciated robustness due to lack of moveable parts.

However, writing data to a solid-state memory device such as a flash memory device requires paying attention to specifics in the flash technology: NAND Flash memory is organized in units of pages and blocks. Multiple pages form a block. While read and write operations can be applied to pages as a smallest unit of such operation, erase operations can only be applied to entire blocks. And while in other storage technologies outdated data can simply be overwritten by new data, flash technology requires an erase operation before new data can be written to an erased block.

Because in flash technology erase operations take much longer than read or write operations, a writing technique is applied called "write out of place" in which new or updated data is written to some free page offered by a free page allocator instead of writing it to the same page where the outdated data resides. The page containing the outdated data is marked as invalid page.

At some point in time, a process called "garbage collection" frees blocks for new writes by moving the content of all valid pages of a block to free pages at one or more different blocks. As a result, the subject block finally comprises invalid pages only and can be erased. While this procedure requires some additional write operations in excess, it is apparent that by such approach immediate as well as frequent erase operations are avoided which would contribute to a much higher overall processing than an overhead of some additional write operations do.

The same mechanism applies to any memory structure in which new or updated data are written out-of-place, whereby data updates to outdated data are not written to the subunit containing the outdated data, but to a log which provides a series of free subunits where data is to be written to and where such subunits typically can not be subunits subsequent to each other in the organization of the storage device but can be scattered around the storage device and be offered by an allocation engine. Such systems can be referred to as log-structured file systems.

In the following, it can be referred to blocks instead of units, and to pages instead of subunits. Blocks and pages follow a nomenclature used in connection with flash-based solid-state storage devices. For the entire application it is understood that neither the content nor the scope of protection shall be restricted to the flash-based storage technology. Any other solid state storage technology such phase change memories, magnetic RAM memories, etc. shall be encompassed, too, as is any log structured file system making use of a storage device in a log-structured way.

The more data is written over time, the less free pages can be offered and new blocks can need to be reclaimed for a free block queue, i.e. a queue for providing free, i.e. erased blocks for writing new or updated data to. New free blocks need to be reclaimed from blocks filled with valid and/or invalid data. The block reclaiming process first identifies blocks for cleaning based on a given policy. Then valid data still residing in these blocks is copied (relocated) to other blocks, and finally the blocks that now are free from valid data are erased and become available again for rewriting. Consequently, the reclaiming mechanism introduces additional read and write operations, the extent of which depends on the specific policy deployed as well as on system parameters. The additional write operations result in the multiplication of user writes, a phenomenon referred to as "write amplification". As the number of erase/write operations that can be performed before a solid state storage device wears out is limited, the extent of the write amplification is critical because it negatively affects the lifetime and endurance of solid state storage devices. Therefore, a reclaiming mechanism is efficient when it keeps the write amplification as low as possible, and also achieves a good wear leveling in the sense of blocks being worn out as evenly as possible.

In connection with log-structured file systems implemented on a hard disk reclaiming mechanisms are discussed. In "The Design and Implementation of a Log-Structured File System" by M. Rosenblum and J. Ousterhout, ACM Transactions on Computer Systems, Volume 10, No 1, pages 26-52, February 1992, a technique for disk storage management called a log-structured file system is introduced which writes all modifications to a disk sequentially in a log-like structure, thereby speeding up both file writing and crash recovery. The log is the only structure on the disk; it contains indexing information so that files can be read back from the log efficiently. In order to maintain large free areas on disk for fast writing, the log is divided into segments and uses a segment cleaner to compress the live information from heavily fragmented segments. One of the cleaners introduced uses a policy where it always chooses the least-utilized segments to clean.

When put in context with a flash-based solid state drive, the above policy introduces the usage of blocks only with the smallest number of valid pages for erasure, such that it yields the most amount of free space for reclaiming by means of a single action. As systems encountered in practice are comprised of thousands of blocks, the above reclaiming process would take a substantial amount of time to examine all of the blocks in order to select the block with the minimum amount of valid pages. This is also the case when the number of valid pages of blocks is constantly updated upon each host write. Depending on the processor's capabilities the time required can be prohibitively long.

To reduce the number of CPU cycles consumed by the such reclaiming process a windowed reclaiming scheme is proposed in "Write Amplification Analysis in Flash-Based Solid State Drives" by X.-Y. Hu, E. Eleftheriou, R. Haas, I. Iliadis, and R. Pletka, in Proceedings of the Israeli Experimental Systems Conference (SYSTOR), Haifa, Israel, pp. 1-9, Can 2009. According to this scheme, occupied blocks are maintained in a queue according to the order in which they have been written, with the oldest blocks occupying the first positions. The windowed reclaiming process restricts the selection process to the oldest w blocks only, which correspond to the first w positions in the queue as they are more likely to contain the least number of valid pages. As the window size w decreases, the number of CPU cycles consumed by the reclaiming process decreases, but the write amplification increases. The optimal choice of w requires knowledge of the overprovisioning factor of the system, which however can either not be available, or vary, i.e. not being constant during the lifetime of the device.

SUMMARY OF THE INVENTION

According to one aspect of the invention, there is provided a method for managing a computerized memory for storing data. The memory comprises units, each of the units comprising subunits. Data updates are written to a subunit different from the subunit the outdated data is contained. The one or more subunits containing the outdated data are invalid. A subunit containing up to date data is a valid subunit. For reclaiming units it is searched amongst the units to identify a unit that matches a predetermined criterion. After a unit that matches the predetermined criterion is identified, the search is stopped and data of valid subunits of an identified unit is rewritten into subunits of at least another unit.

According to another aspect of the present invention, a storage device is provided. The storage device includes a memory, which memory includes units, each of the units including subunits, a subunit containing either data up to date being a valid subunit or outdated data being an invalid subunit. A memory controller is adapted for writing data updates to a subunit different to the subunit the outdated data is contained whereby the subunit containing the outdated data is invalid. The controller is adapted for searching amongst the units to identify a unit that matches a predetermined criterion and stopping the search after a unit that matches the predetermined criterion is identified. The controller is adapted for rewriting data of valid subunits of an identified unit into subunits of at least another unit.

It is understood that method steps can be executed in a different order than listed in a method claim. Such different order shall also be included in the scope of such claim as is the order of steps as presently listed.

Embodiments described in relation to the aspect of the method shall also be considered as embodiments disclosed in connection with any of the other categories such as the device, the computer program product, etc.

BRIEF DESCRIPTION OF THE DRAWINGS

The invention and its embodiments will be more fully appreciated by reference to the following detailed description of presently preferred but nonetheless illustrative embodiments in accordance with the present invention when taken in conjunction with the accompanying drawings.

DETAILED DESCRIPTION OF THE PREFERRED EMBODIMENTS

Figure 1:
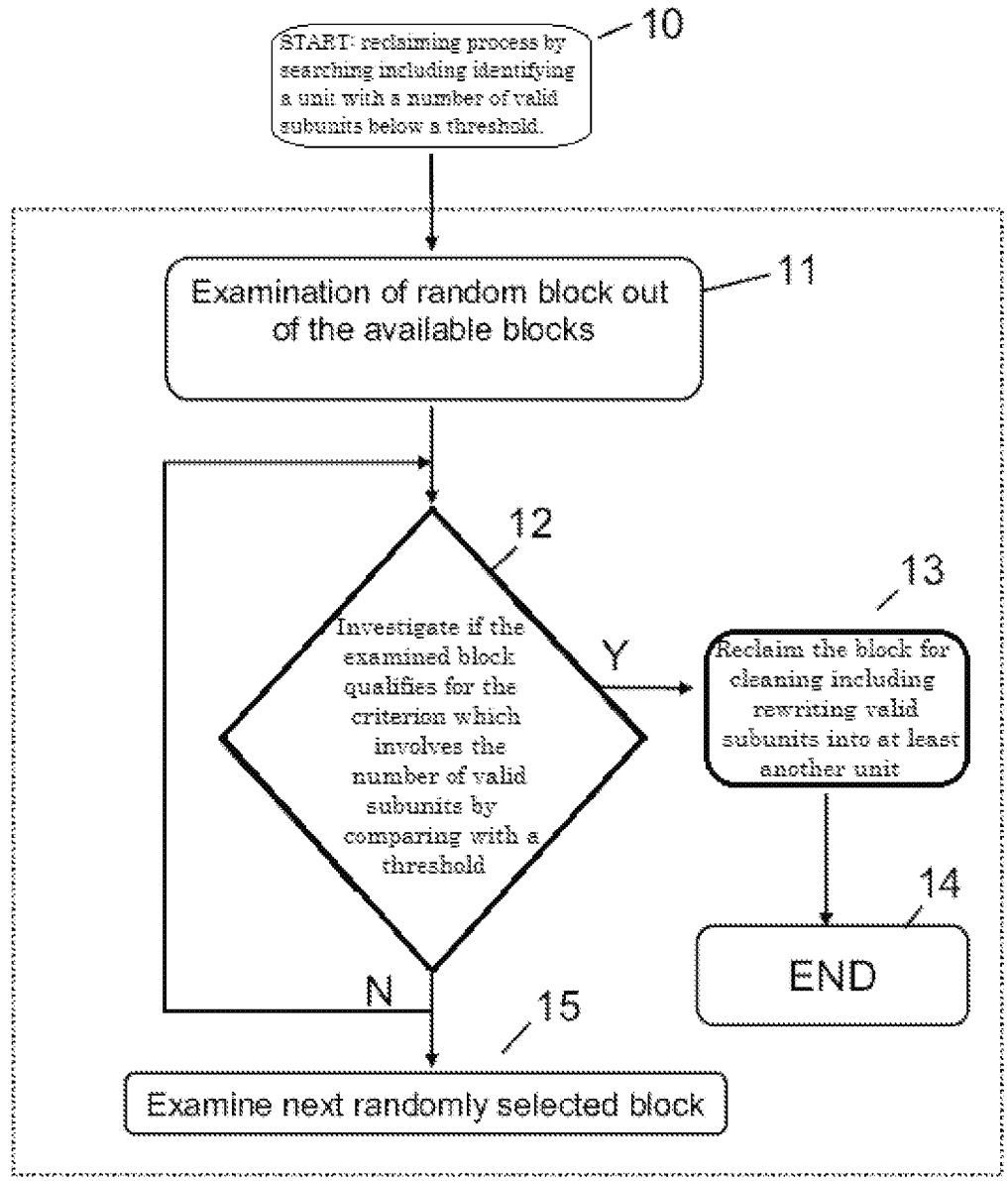
FIG. 1 a flow diagram of a method according to an embodiment of the present invention.

As an introduction to the following description, a way of managing a computerized memory for storing data is described. In particular, a way for identifying a unit in the memory which a unit is to be prepared for erasure is described.

In memories of interest, data is stored in units where each of the units includes subunits. The separation of the memory space into units and subunits can be owed to physical or technological characteristics of such memories. A unit can constitute the smallest entity for erase operations while a subunit can constitute the smallest entity for read or write operations. In such memories, data updates are written to a subunit or unit different to the subunit or unit the outdated data is contained in. The one or more subunits containing the outdated data are invalid. Such subunits can be marked as invalid. Alternatively, a data structure is maintained for each unit specifying the location or the subunit valid data is contained in.

During operation, in a representative unit, invalid subunits can exist next to valid subunits where a subunit containing updated data is considered a valid subunit. Over time, more and more units can contain a mix of valid and invalid subunits wherein some of the units can contain more valid subunits than invalid subunits and others can contain more invalid subunits than valid subunits. The more data is written to such memory, the more limited the free memory space available for writing becomes.

In the flash memory arena, a data structure or engine respectively denoted as free block queue or free block allocator provides blocks free of data that are ready to be written. A free block typically is a block that was recently erased and is not rewritten yet. However, such free block queue can dry out and can no longer provide a sufficient number of free blocks for the current data input such that a process for reclaiming one or more blocks can be started. Reclaiming a block basically is understood as converting a block yet containing data, be it valid or invalid or both, into a free block by erasing the existing data from such block.

It is apparent that the identification of a unit suitable to be reclaimed is crucial in view of additional CPU cycles needed for reclaiming such unit. Accordingly, a search is performed amongst the units to identify at least one unit that matches a predetermined criterion. The search is stopped after a unit that matches the predetermined criterion is identified. This means that the search is stopped before all the units are completely examined, unless no single unit matching the predetermined criterion is identified. The method results in searching a not a priori known number of units until one or more appropriate units have been identified. Preferably, the search is stopped immediately after the first unit matching the predetermined criterion has been identified. Alternatively, the search is stopped once a predefined number of units, e.g. the second or third unit, have matched the predetermined criterion.

Data of valid subunits of an identified unit is rewritten into subunits of at least one more unit. In case there is more than one unit identified, e.g. n units, it is preferred that the valid subunits of all n identified units are rewritten to one or more other units. Alternatively, the valid subunits only of a selection of identified units are rewritten to one or more other units. For example, only the valid subunits of the $n^{th}$ unit are rewritten to another unit. A criterion preferably can look into the number of valid subunits comprised in a unit for the reason that a low number of valid subunits results in a low number of data rewrites to another unit for saving such still valid data.

In such way, an efficient and fast process for reclaiming units can be implemented for solid state storage devices, and also for log-structured file systems alternatively. Again, it is emphasized that for the present application the terminology can change between unit and block and between subunit to page for the reason that some of the embodiments are explained with respect to solid state storage devices and in particular flash based memory devices. However, it is understood that all these embodiments can be applicable to other storage devices organized in units/subunits.

The present idea is based on the understanding that in large storage systems, a uniformly-distributed random small user writes the number of valid pages relocated by a reclaiming mechanism. The reclaiming mechanism searches for the lowest number of valid pages amongst all blocks and typically takes one of two successive values. This can be demonstrated by means of simulation and also be proved analytically. This perception can be used in applying a search strategy different to barely look at the lowest number of valid pages in all blocks of the memory.

In contrast, once a block with a number of valid pages preferably equal to the minimum of these two values has been found, the searching process can be terminated because none of the remaining blocks will contain fewer valid pages. This procedure is reflected in an embodiment of the present invention according to which the process of searching for a block suited for reclaiming including erasure is terminated before all the blocks of the memory, at least the ones containing user data, are examined. The proposed method results in a decreased number of CPU cycles required while maintaining the write amplification close to the optimal. In addition, a low degree of wear leveling is provided. A system utilizing such block reclaiming scheme provides flexibility in terms of write amplification, implementation complexity, and latency such that the system can be designed according to various tradeoffs.

The criterion can either be known in advance, or can be dynamically obtained by monitoring the number of relocated pages at an initial phase, or at regular intervals. It can be dynamically adjusted as the operational characteristics of the system change. Once a block is identified in the search process, the preparation for erasure of such block can include copying, transferring or rewriting all valid subunits of this block to one or more other blocks subject to availability of free pages on such other blocks.

FIG. 1 shows a flow diagram of a method according to an embodiment of the present invention. In step 10, the block reclaiming process is triggered. There are various options when the reclaiming process is to be started. It can be started at regular intervals; it can be started at a point in time when it is identified that the free memory space available for writing data to be below a threshold—a similar option can be the length of the free block queue being less than a given value.

Subject to the embodiment, step 10 can also include preparatory actions for searching the blocks. For examples, in case not all the blocks shall form a pool for the search such pool can be determined in step 10 as well as the sequence of blocks to be examined out of such pool. Only blocks that fulfill a condition can form the pool. Such condition can, for example, include that only the youngest blocks are considered wherein young can be interpreted as under a maximum age since the most previous erasure of such block. Such condition reflects that there can be blocks that contain hot, i.e., frequently changed data, and as a result can contain many invalid pages. Alternatively, the blocks can be randomly picked for forming a pool. In addition, the sequence of blocks to be searched within a pool of blocks can be specified. Such sequence can be determined upfront by a random sequence. The sequence can be a predefined sequence of blocks, e.g. in a pool formed according to age considerations. The blocks to be searched can start with the youngest block in the pool, continue with the next youngest, and so on—or the sequence can follow a block ID.

As explained, the pool formation and the searching sequence can be defined in step 10, i.e. every time a block needs to be reclaimed. Such pool formation and searching sequence can also be determined once for multiple block reclaiming activities, e.g. when the reclaiming frequency is considerably high. The pool forming activities would require considerable processing power. The pool formation and searching sequence as specified in step 10 can also be modified each time a new block needs to be examined, e.g. within step 15.

If all blocks available can form the pool for searching, which still can exclude all free blocks, all valid blocks, and blocks containing meta data, and if the searching sequence is random, a random block out of the available blocks will be examined in step 11. It was found that starting to search the pool with a random block can lead to better results such that the first block fulfilling the criterion can appear faster than when starting to search the pool with the first block ID. The blocks following the first randomly picked block can also be randomly picked, or follow a predetermined sequence, e.g. the block ID.

In step 12 it is investigated if the examined block qualifies for the criterion. If the block does not qualify (N), the next randomly selected block will be examined in step 15. In step 12 this next block is examined versus the criterion. This can be repeated until in step 12 a block is confirmed to qualify for the criterion. In such case (Y), this block is the block identified to be "recycled"/"reclaimed"/or "elected" for being cleaned, see step 13. Step 13 can include any activities involved in reclaiming the block, and in particular can include copying any valid pages on this block to another block for the reason that the valid data of these pages shall continue to be accessible. When such rewriting of valid pages is finalized, this block shall only hold invalid or free pages such that it can be subsequently erased. The searching of a block to be reclaimed is finalized in step 14. There are no more activities even if another block out of the pool can be better suited for reclaiming. Any erased block can be assigned to the free block queue, which serves the memory system as a supply of blocks to which new data can be written.

In some scenarios, none of the blocks in the specified block pool can be identified to satisfy the criterion, which results in searching the whole block pool. For such event, in order to nevertheless identify a closest match, it is preferred to keep track of the one or more blocks coming closest to the criterion. Such block coming close can be used for reclaiming instead.

The criterion according to which a block is identified to be the one to be reclaimed can involve one or more of the following parameters:
  the number of valid pages of a block;
  the number of invalid pages of a block;
  the number of free pages of a block;
  the age of the block;
  the time of the most recent write activity to such block;
  the time of the earliest write activity to such block;
  the frequency of write activities to such block (i.e. the wear of such block).

The criterion can involve any combination of two or more of the above parameters in form of subcriteria. The criterion can involve a comparison of any one of the above parameters with a threshold and the criterion can be fulfilled when the parameter is above a threshold. According to another criterion, the criterion can be fulfilled if a parameter is found to be below a threshold. The criterion can include a comparison of multiple of the above parameters with individually assigned thresholds, and such criterion can be fulfilled when all the parameters are above or below their respective thresholds. A sample criterion can include "search until a block with a number of valid pages less than 12 and an age less than 100 are found".

A threshold can be a predefined threshold and can not change during operation. A threshold can be predefined and depend on the memory system characteristics. Advantageously, the threshold can be determined in view of the number of pages per block the memory system provides; and/or in view of a ratio between an average number of valid subunits in all blocks and the total number of subunits in the memory. The threshold can be a variable threshold which during operation can take different values. E.g. the threshold can depend on a ratio between an absolute or a floating (average) number of valid subunits in all blocks and the total number of subunits in the memory.

The threshold can be an adaptive threshold which can depend on other parameters. The threshold can be adaptive also with respect to previous threshold values, or it can be adaptive with respect to the actual number of valid subunits of previously identified blocks, specifically, if the number of valid subunits in the previously identified block is taken as a new value for the threshold. Alternatively, a moving average of the numbers of valid subunits in the previously identified blocks is taken as a new value for the threshold.

In a very preferred embodiment, the criterion includes, and can even consist of the number of valid pages in a block being compared to a threshold, which criterion is fulfilled if the number of valid pages in a block is below such threshold. In such embodiment, the number of valid pages of the examined blocks is compared to such threshold. The process terminates after the $n^{th}$ block is found which fulfils the criterion and contains a number of valid pages, which is less than or equal to such page threshold. The condition for stopping the search clearly is after the first unit matching the criterion is identified, however, the condition can involve searching for n blocks fulfilling the criterion and stop when the $n^{th}$ block is identified, and at least can terminate prior to examining all the blocks available. Clearly, this process is faster than when looking into all blocks for determining the respective valid pages and finally selecting the block with the lowest number of valid pages for recycling.

Figure 2:
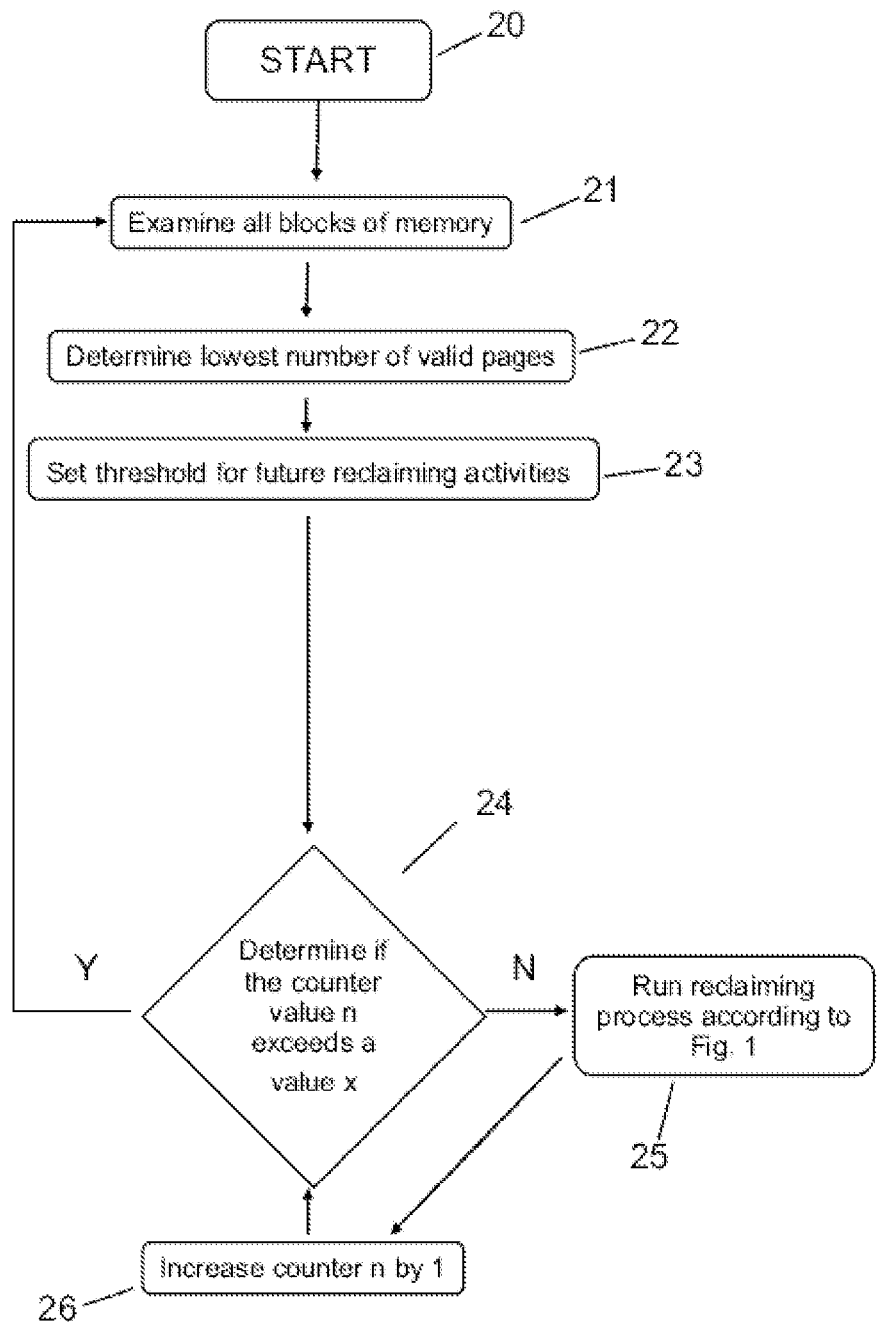
FIG. 2 a flow diagram of a method according to another embodiment of the present invention.

FIG. 2 illustrates a flow chart according to an embodiment of the present invention. In such embodiment, the reclaiming process is started in step 20. In step 21 all blocks of the memory, except for free blocks, all valid blocks and blocks containing meta data, are examined. Alternatively, a pool of selected blocks is evaluated. Amongst all these blocks the block with the lowest number of valid pages is determined in step 22. In step 23, the threshold for future reclaiming activities is set to the value of this lowest number as identified in step 22. The subject block is prepared for erasing, and a counter n is set to zero, all in step 23. Then, after a certain time has passed or by means of a trigger, it is determined if the counter value n exceeds a value x in step 24.

If the counter value n is below x (N), the specific reclaiming process according to FIG. 1 is run in step 25. This process run is marked in FIG. 1 by a dashed line rectangle. In this process the blocks are only examined as soon as a block is found which satisfies the criterion of the number of valid pages in such block being equal or less than the threshold which threshold was determined and set in step 22. After each successful run of such process 25 with the identification of a block to be reclaimed (and without any further search in the remaining blocks of the pool) and the rewriting of the valid pages to other locations, the counter n is increased by one in step 26. Whenever the next block needs to be reclaimed the counter is checked again in step 24.

Whenever the counter value exceeds the predetermined value x, the "lean" reclaiming process of step 25 can already be run multiple times such that the threshold can no longer reflect the optimum threshold in the "lean" reclaiming process. As a result, resources can be spent again for the "extended" reclaiming process in steps 21 to 23 which can result in the setting of a new threshold value for the "lean" reclaiming process.

Instead of counting the number of times the "lean" reclaiming process in step 25 is run, the time passing since the last "extended" reclaiming process can be monitored and the next "extended" reclaiming process can start subject to the passed time. As outlined above, the "extended" reclaiming process is primarily for updating the threshold of the "lean" reclaiming process along the lowest value of valid pages for all blocks in the pool. The updated threshold can be set to this lowest value, or e.g. to this lowest value plus 1, or this lowest value plus 2....

In another embodiment, the reclaiming process is started and run according to the process in FIG. 1. As explained in connection with FIG. 1, such reclaiming process can run frequently in regular intervals or by triggered by an event. In a modified operation, whenever the reclaiming process is terminated by finding one or more blocks with a number value of valid subunits below a threshold, a counter for such number value is increased by one or the number of blocks identified with such number value respectively, which action can be included in step 13. This means that counters are maintained for such number values in order to monitor the frequency of appearances of blocks with the respective number value of valid subunits selected. At a regular interval, the threshold value can be adapted, e.g. to the number value which the highest counter, or to an average of the counter values, etc.

Figure 3:
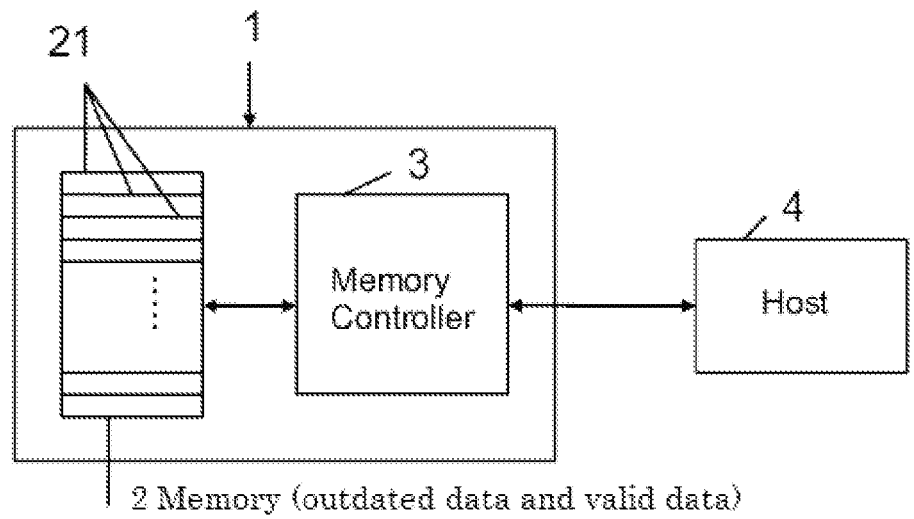
FIG. 3 a block diagram of a storage device according to an embodiment of the present invention.

FIG. 3 shows a block diagram of a storage device according to an embodiment of the present invention. The storage device (1) includes a flash based solid state memory (2) with a block/page memory space structure. Few of the blocks are indicated as (21). A memory controller (3) is controlling the activities of the flash memory (2)—as such the memory can be described as a computerized memory. The memory controller (3) specifically is adapted for writing data to and reading data from the memory (2), and for executing all administrative tasks in connection with the reading and writing of data. Specifically, the memory controller (3) writes updates to a page of a block to one or more blocks different to the block the outdated data is contained in ("write out-of-place"). When doing so, the memory controller (3) flags the one or more subunits containing the outdated data as invalid. From time to time, the memory controller (3) executes a search amongst the blocks—whereas such search can be limited to blocks containing at least one page of invalid data and/or limited according to other criteria—in order to identify one or more blocks matching a predetermined criterion. Once such block is identified, the search is terminated and any remaining blocks not searched yet will no longer be examined. The memory controller (3) initiates the rewriting of data of valid pages of this identified block to pages of another block, and possibly even to multiple other blocks. In this context, the memory controller (3) is responsible for running a method according to any of the embodiments descried above. The memory controller (3) further is connected to a host (4) which makes use of the storage device (1) for storing data. Hence, the host (4) issues read and/or write commands to the storage device (1).

Figure 4:
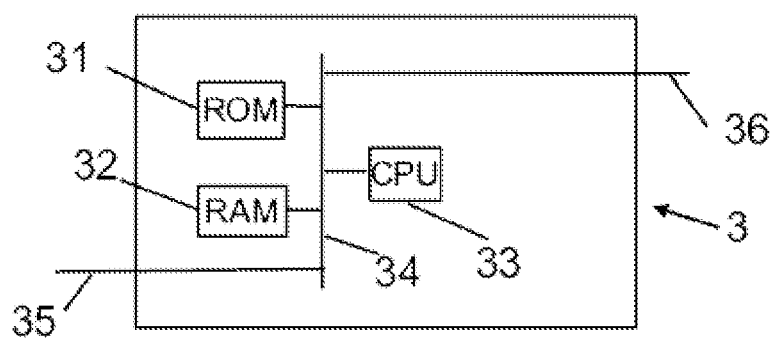
FIG. 4 a block diagram of a memory controller according to an embodiment of the present invention.

In order to implement the method according to any one of the embodiments as described above, the memory controller (3) preferably provides a computer program code preferably stored in a non-volatile, non-rewritable storage medium such as a ROM (31) see FIG. 4. The storage controller further provides a RAM (32) for loading the program code into, and a processing unit (33) for executing the program code in the RAM (32). Internal communication systems (34) are provided for communicating between the components of the memory controller (3), and an interface (35) is provided for communicating with the flash memory, while another interface (36) can be provided for any communication with the host.

Figure 5:
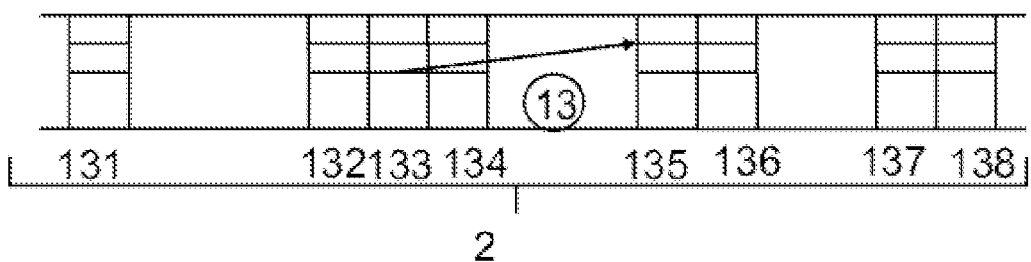
FIG. 5 a schematic illustration of a portion of the memory space of a flash based memory according to an embodiment of the present invention.

Finally, FIG. 5 illustrates a part 2 of a flash memory organized in blocks of which few blocks 131 to 138 are explicitly shown. Pages are indicated as horizontal stripes in a column like illustrated block. All the blocks 131 to 138 are data blocks adapted for holding user data and can include pages containing invalid data and pages containing valid data. In the present example, it is assumed that a block for erasure is already identified by means of the above process. In the present example, it is assumed that block 133 proved to have a number of valid pages that is below a pre-determined threshold. As a result, and as described in step 13 in FIG. 1 which step is indicated by an arrow in FIG. 5, too, the pages containing valid data are copied, i.e. rewritten to another block, i.e. block 135 in the present example, which block currently supports the writing of new or updated data. With respect to such relocation of data, logical to physical address mappings are updated. And, according to the present routine, the respective pages in block 133 now containing outdated data are invalid pages and can be flagged as such. In a next step, entire block 133 can be erased, and can be added to in a free block queue.

As will be appreciated by one skilled in the art, aspects of the present invention can be embodied as a device, system, method or computer program product. Accordingly, aspects of the present invention, in particular in form of the controller, can take the form of an entirely hardware embodiment, an entirely software embodiment (including firmware, resident software, micro-code, etc.) or an embodiment combining software and hardware aspects that can all generally be referred to herein as a "circuit," "module" or "system." Furthermore, aspects of the present invention, such as the read and write methods, can take the form of a computer program product embodied in one or more computer readable medium(s) having computer readable program code embodied thereon.

Any combination of one or more computer readable medium(s) can be utilized. The computer readable medium can be a computer readable signal medium or a computer readable storage medium. A computer readable storage medium can be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium can be any tangible medium that can contain, or store a program for use by or in connection with an instruction execution system, apparatus, or device.

A computer readable signal medium can include a propagated data signal with computer readable program code embodied therein, for example, in baseband or as part of a carrier wave. Such a propagated signal can take any of a variety of forms, including, but not limited to, electro-magnetic, optical, or any suitable combination thereof. A computer readable signal medium can be any computer readable medium that is not a computer readable storage medium and that can communicate, propagate, or transport a program for use by or in connection with an instruction execution system, apparatus, or device.

Program code embodied on a computer readable medium can be transmitted using any appropriate medium, including but not limited to wireless, wireline, optical fiber cable, RF, etc., or any suitable combination of the foregoing.

Computer program code for carrying out operations for aspects of the present invention can be written in any combination of one or more programming languages, including an object oriented programming language such as Java, Smalltalk, C++ or the like and conventional procedural programming languages, such as the "C" programming language or similar programming languages. The program code can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions can also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions can also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams can represent a module, segment, or portion of code, which comprises one or more executable instructions for implementing the specified logical function(s). It should also be noted that, in some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention claimed is:

1. A method for managing a computerized memory for storing data, the memory comprising units, each of the units comprising subunits, the method comprising:
   searching amongst the units to identify a unit that matches a predetermined criterion;
   responsive to identifying the unit that matches the predetermined criterion thereby forming an identified unit, stopping the search and rewriting data of valid subunits of the identified unit into at least one other unit, wherein the predetermined criterion comprises a number of valid subunits of the unit, a number of invalid subunits of the unit, a number of free subunits in the unit, an age of the unit, a time of a most recent write activity to the unit, a time of an earliest write activity to the unit, and a frequency of write activities to the unit; and
   erasing the identified unit hereby making the identified unit available for reuse.

2. The method of claim 1, wherein the searching is stopped after an $n^{th}$ unit matching the predetermined criterion is identified, and wherein rewriting data comprises rewriting at least data of valid subunits of the $n^{th}$ identified unit into the at least one other unit, wherein $1 \leq n < N$, N being a maximum number of units to be searched.

3. The method of claim 1, wherein the searching includes searching amongst the units to identify a unit that contains the number of valid subunits below a threshold.

4. The method of claim 3, wherein the threshold is defined subject to a number of subunits per unit and to a ratio between the number of valid subunits and the total number of subunits in the memory.

5. The method of claim 3, wherein the threshold is a threshold adaptive to the number of valid subunits of previously identified units.

6. The method of claim 4, wherein the threshold is a threshold adaptive to the number of valid subunits of previously identified units.

7. The method of claim 3, wherein the unit with the lowest number of valid subunits is identified amongst all the units, and wherein the threshold is set to this lowest number.

8. The method of claim 5, wherein counters for the numbers of valid subunits are maintained, and wherein the counters are adapted each time a unit with the respective number of valid subunits is identified.

9. The method of claim 7, wherein counters for the numbers of valid subunits are maintained, and wherein the counters are adapted each time a unit with the respective number of valid subunits is identified.

10. The method of claim 1, wherein the searching is carried out sequentially amongst units ordered according to an age index.

11. The method of claim 1, wherein the searching is carried out sequentially amongst a sequence of units, starting from a unit randomly chosen in the sequence.

12. The method of claim 1, wherein the searching is carried out according to a specified unit sequence.

13. The method of claim 1, wherein the memory is a non-volatile solid state memory device or is a memory of a log-structured file system.

14. The method of claim 1, wherein the memory is a flash memory device, and wherein the units are blocks and the subunits are pages of the flash memory device.

15. A computer program product comprising a non-transitory computer readable storage medium having a computer readable program stored therein, wherein the computer readable program, when executed on a computer, causes the computer to:
   search amongst units comprised within a memory to identify a unit that matches a predetermined criterion;
   responsive to identifying the unit that matches the predetermined criterion thereby forming an identified unit, stopping the search and rewriting data of valid subunits of the identified unit to subunits of at least one other unit, wherein the predetermined criterion comprises a number of valid subunits of the unit, a number of invalid subunits of the unit, a number of free subunits in the unit, arg age of the unit, a time of a most recent write activity to the unit, a time of an earliest write activity to the unit, and a frequency of write activities to the unit; and
   erase the identified unit thereby making the identified unit available for reuse.

16. A storage device, comprising:
   a memory comprising units, each of the units comprising subunits, a subunit containing either up to date data being a valid subunit or outdated data being an invalid subunit; and
   a memory controller configured to:
      search amongst the units to identify a unit that matches a predetermined criterion;
      responsive to identifying the unit that matches the predetermined criterion thereby forming an identified unit, stop the search;
      rewrite data of valid subunits of the identified unit into subunits of at least one other unit, wherein the predetermined criterion comprises a number of valid subunits of the unit, a number of invalid subunits of the unit, a number of free subunits in the unit, an age of the unit, a time of a most recent write activity to the unit, a time of an earliest write activity to the unit, and a frequency of write activities to the unit; and
      erase the identified unit thereby making the identified unit available for reuse.

17. The storage device as in claim 16, wherein the memory is a flash based solid state memory with a block/page memory space structure.

18. The storage device as in claim 16, wherein the memory is a non-volatile solid state memory device or is a memory of a log-structured file system.

* * * * *